(12) United States Patent
Cuccia

(10) Patent No.: US 6,337,719 B1
(45) Date of Patent: Jan. 8, 2002

(54) APPARATUS FOR RECEIVING SIGNALS DURING POWER-OFF (STAND-BY) MODE

(75) Inventor: David W. Cuccia, Annapolis, MD (US)

(73) Assignee: U. S. Philips Corporation, New York, NY (US)

( * ) Notice: Subject to any disclaimer, the term of this patent is extended or adjusted under 35 U.S.C. 154(b) by 0 days.

(21) Appl. No.: 09/050,488

(22) Filed: Mar. 30, 1998

(51) Int. Cl.[7] .............................. H04N 5/50; H04N 5/63; H04N 5/54; H04N 11/00; H04B 7/00; H04B 1/16; H04M 1/00

(52) U.S. Cl. ...................... 348/731; 348/731; 348/725; 348/906; 348/554; 348/465; 455/343; 455/574; 455/38.3

(58) Field of Search ................................ 348/906, 553, 348/730, 725, 465, 731, 569, 570; 455/343, 574, 38.3

(56) References Cited

U.S. PATENT DOCUMENTS

| 4,858,006 A | * | 8/1989 | Suzuki et al. ............... 358/139 |
| 4,866,525 A | * | 9/1989 | Rodriguez-Cavazos et al. . 358/190 |
| 5,047,867 A | * | 9/1991 | Strubbe et al. ............. 358/335 |
| 5,231,493 A | * | 7/1993 | Apitz .......................... 358/146 |
| 5,369,798 A | * | 11/1994 | Lee ............................. 455/33.1 |
| 5,532,753 A | * | 7/1996 | Buchner et al. ............. 348/569 |
| 5,977,962 A | * | 11/1999 | Chapman et al. ........... 345/327 |
| 6,091,456 A | * | 7/2000 | Schaas ........................ 348/460 |

FOREIGN PATENT DOCUMENTS

| DE | 4240187 A1 | 6/1994 |
| EP | 0774868 A1 | 5/1997 |

OTHER PUBLICATIONS

"Der Meue Videotext", Funkschau ½ 1998, pp. 106–107.

* cited by examiner

Primary Examiner—Reinhard J. Eisenzopf
Assistant Examiner—Paulos Natnael
(74) Attorney, Agent, or Firm—Laurie E. Gathman

(57) ABSTRACT

The invention relates to a receiving apparatus comprising a receiver for receiving signals, e.g. radio or television signals, which comprises means for collecting particular information incorporated in at least a part of the signals, e.g. in order to build a compound electronic program guide. The apparatus according to the invention is adapted to perform the scanning when the receiver is not in use, e.g. during stand-by mode, or when the apparatus is performing a function which does not involve the receiver.

4 Claims, 2 Drawing Sheets

APPARATUS FOR RECEIVING SIGNALS DURING POWER-OFF (STAND-BY) MODE

BACKGROUND OF THE INVENTION

The invention relates to a receiving apparatus for receiving a plurality of transmitted signals, comprising tuning means for selecting a selected signal from the transmitted signals in response to control signals, first signal processing means for extracting and processing a first type of information from the selected signal, and second signal processing means for extracting and processing a second type of information from the selected signal, the receiving apparatus having a coupled state in which an input of the first signal processing means is effectively coupled to an output of the tuning means, and a decoupled state in which the input of the first signal processing means is effectively decoupled from the output of the tuning means.

Such a receiving apparatus is widely known. For example, a digital television receiver comprises tuning means for receiving a plurality of TV-channels, which carry transport streams comprising video and audio information, constituting the first type of information, as well as system information (SI), constituting the second type of information. A digital television receiver generally comprises an audio processor and a video processor, constituting the first signal processing means, and a microprocessor, constituting the second signal processing means.

Many television receivers offer the possibility to view other signals than those acquired via the tuning means, e.g. recordings from a VCR or images from a camera. If the other signals are obtained through a SCART input, the tuning means are effectively decoupled from the audio and video processor. This situation is considered to exist as well in a stand-by or power-off mode, because in such cases there is no transport of signals between the tuning means and the first signal processing means.

Most TV-stations incorporate electronic program information (EPG) presenting programs which are scheduled to be transmitted via that particular TV-channel. For an end-user it is difficult to get an overview of the programs of all channels, because the information is scattered over multiple channels, which makes it very cumbersome to collect the information.

In EP 0 774 868 A1 a television system is described, requiring a compound EPG to be transmitted in advance, which EPG comprises information about the scheduled programs of a large number of channels. The system provides a number of features to manage the large amount of information, e.g. searching and filtering. Programs of different channels can be presented in one time-table, and a user may select one or more program categories. The user is enabled to enter search requests, as a result of which the system tries to find the requested items in the compound EPG. Another option is the notification of the user that a particular program is about to be transmitted. Such a compound EPG is a large improvement over EPG information which is scattered over various channels.

This example shows that it can be very convenient to collect information from various sources and make it available to a user in a compound form. A disadvantage of the known system, however, is that the compound information has to be composed in advance and transmitted through a dedicated channel, thus requiring additional transmission capacity.

SUMMARY OF THE INVENTION

An object of the present invention is to provide a receiving apparatus which provides the user with compound information, composed from information incorporated in multiple signals, without the requirement that the compound information is composed in advance and transmitted through a dedicated signal.

To achieve this object, the receiving apparatus according to the invention is characterized in that the receiving apparatus further comprises controlling means which are conceived to generate the control signals for controlling the tuning means when the receiving apparatus is in the decoupled state, said control signals being chosen such that the tuning means successively select a respective signal from at least a number of the transmitted signals, the second processing means being further conceived to extract and process the second type of information from each selected signal. When the apparatus in the decoupled state, i.e. effectively decoupled from the tuning means because the first signal processing means are processing signals not obtained from the tuning means or because the apparatus is in a stand-by mode, the tuning means can be utilized for the scanning process.

A preferred embodiment of the receiving apparatus is characterized in that the second processing means are further conceived to extract an electronic program guide (EPG) from the second type of information. scanning signals for EPG information during e.g. stand-by mode is very profitable, because EPG information is scattered over many signals and updated every day. In a preferred embodiment the second processing means are further conceived to combine EPGs from at least two of the transmitted signals into a compound EPG. Such a compound EPG is very convenient for a user and by performing these activities during e.g. stand-by mode, delays in the operation of the apparatus and in the availability of the EPG information are avoided.

A further embodiment of the apparatus according to the invention is characterized in that the controlling means are conceived to initiate the generation of the control signals for controlling the tuning means automatically. As a consequence, the user does not need to activate the scanning of the TV-signals when the tuning means are not being used. Instead, the apparatus detects such a state and starts the scanning if appropriate, e.g. when certain information is expected to be updated.

In a preferred embodiment the apparatus is characterized in that the controlling means are conceived to generate the control signals in a stand-by mode of the apparatus. In stand-by mode, there is little chance that the scanning be interrupted by the user activating a feature which involves the tuning means.

A further embodiment of the apparatus is characterized in that the controlling means are conceived to generate the control signals in a power-off mode of the apparatus, the apparatus comprising a rechargeable battery for powering the receiving means during the scanning in the power-off mode. Many devices are completely switched off for long periods, because then no energy is required and the risk of fire is minimal. In this embodiment the apparatus according to the invention has a further power source for powering the circuits involved in scanning the signals and storing the information obtained. Preferably this power source is rechargeable, the receiving apparatus further comprising charging means for charging the power source in a power-on mode.

It is to be noted that the German patent application DE 42 40 187 A1 discloses a TV-set which comprises a second tuner and additional second signal processing means for scanning TV signals EPG information, the additional second signal processing means being adapted to compose a compound EPG from the acquired EPG information. The compound EPG comprises program information from all TV stations for which EPG information was extracted from the signals. It can be inspected by means of the television screen. A disadvantage of this invention is that for scanning the TV signals an additional tuner and additional second signal processing means are required, which makes the apparatus more expensive.

The invention can be profitably applied to television receivers, but it can be applied equally well to, for instance, radio receivers.

DESCRIPTION OF THE PREFERRED EMBODIMENTS

Figure 1:
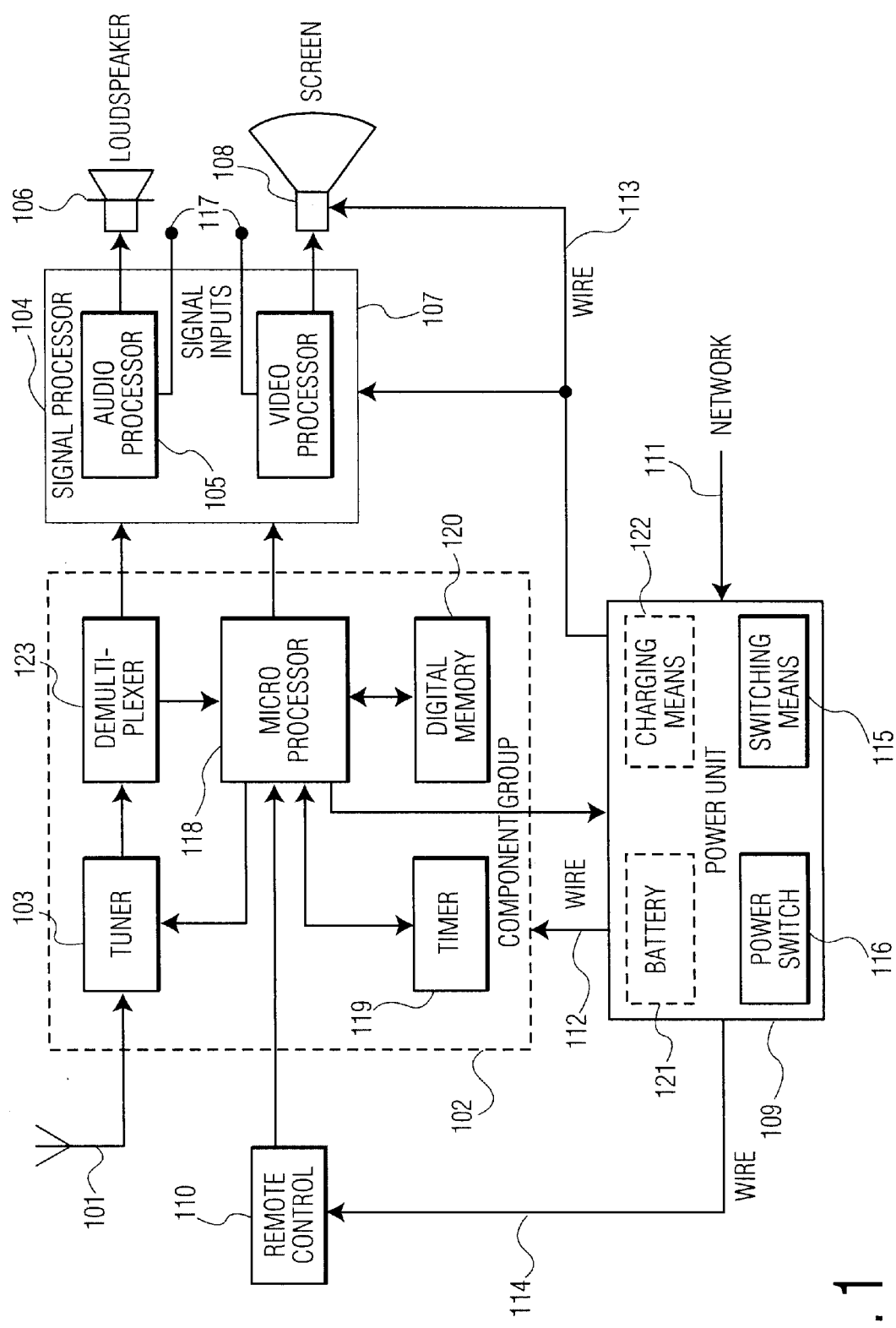
FIG. 1 shows a digital TV-set which is conceived to scan signals in stand-by mode.

FIG. 1 shows a diagram of a digital TV-set as an embodiment of the apparatus according to the invention. A plurality of transport streams, e.g. MPEG-2 streams, are received from the ether by an antenna 101 or, alternatively, from a cable network. Each transport stream may contain multiple programs for presentation to a consumer. Video, audio and additional data for these programs are encoded in transport packets which are time-multiplexed in the transport stream. One of the received transport streams is selected by a tuner 103 and demultiplexed by the demultiplexer 123. The video and audio signals are transmitted to a first signal processor 104, while the additional data, e.g. system information (SI), are transmitted to a microprocessor 118. The audio signal is further processed by an audio processor 105 and a loudspeaker 106. The video signal is further processed by a video processor 107 and presented on a screen 108. The signal processor 104 can also process audio and video signals obtained from signal inputs 117, e.g. signals from a VCR or a camera.

A power unit 109 receives electrical power from a network 111. The power can be distributed to a group of components 102 which includes the micro processor 118, the tuner 103, the demultiplexer 123, a digital memory 120 and a timer 119, and furthermore to the signal processor 104, the screen 108 and a remote control unit 110, through wires 112, 113 and 114 respectively. The power unit 109 comprises a power switch 116 for disconnecting the TV-set entirely from the network 111, and switching means 115 for switching the power supply of the group 102, the signal processor 104, the screen 108 and the remote control unit 110 in a mutually independent way.

The micro processor 118 can communicate with the tuner 103, the demultiplexer 123, the signal processor 104, the digital memory 120, the timer 119, the remote control unit 110 and the power unit 109. The micro processor 118 takes commands from the remote control unit 110, e.g. for controlling the tuner 103 to select a particular transport stream. It further receives and processes data from the multiplexer 123, e.g. SI. It has I/O access to the digital memory 120, and can transmit information to the signal processor 104 for presentation on the screen 108.

When the TV-set is in stand-by mode, the remote control unit 110 is still powered by the power unit 109 and ready to receive signals from a remote control (not shown). Upon receiving an appropriate signal from the remote control, the remote control unit 110 sends the signal to the micro processor 118, which controls the switching means 115 in such a way that the signal processor 104 and the screen 108 are powered. Another signal from the remote control might be dedicated to initiate the stand-by mode again, switching off the power supply to the signal processor 104 and the screen 108, but preserving the power supply to the remote control unit 110. The power supply to the group 102 is not affected by the stand-by mode, but preserved all the time.

It is an achievement of the invention that the micro processor 118 further serves as controlling means for controlling the tuner 103 autonomously and as second signal processing means for extracting and processing SI from a selected transport stream. The micro processor 118 is conceived to control the tuner 103 in such a way that the tuner 103 successively selects all received transport streams. For each transport stream selected this way, the micro processor 118 checks whether the SI of the transport stream comprises EPG information, and if so, incorporates it in a compound EPG which is stored in the storage means 120. When the tuner 103 is not used, i.e. the TV-set is in stand-by mode or the signal processor 104 is occupied with processing signals from the signal inputs 117, the tuner 103 is free to scan the signals for the EPG information. The scanning process can be initiated by the user or started automatically, e.g. when the EPG information should be updated. To that end the micro processor 118 first checks whether the tuner 103 is available for the scanning process. Generally the micro processor of a digital TV-receiver is involved in controlling the receiver, so it is known per se that the micro processor 118 is able to maintain a state description of the receiver and deduce whether the tuner 103 is involved in supplying information to the signal processor 104 for presenting it on the screen 108 or using in another way, e.g. recording on a video recorder.

The TV-set updates the EPG information once a day, during a period in which the TV-set is in stand-by mode. A convenient time for updating the EPG information is at night. The timer 119 is adapted to measure the time interval since the last update. If the time interval measured by the timer 119 reaches the length of twenty four hours, the micro processor 118 checks whether the TV-set is in stand-by mode, or whether the signal processing means 104 are processing signals from other sources than the tuner 103. If that is the case, the scanning process is initiated, whereby the EPG information from various transport streams is combined into the compound EPG. If the tuner 103 is not available, the micro processor 118 waits until that condition is satisfied, e.g. by the user initiating the stand-by mode. At that moment the scanning process is started. Upon a predetermined user command, the compound EPG is retrieved from the storage means 120 and displayed on the screen 108. When the EPG in the storage means 120 has been updated, the timer 119 is restarted for measuring another twenty four hour period.

In a further embodiment the power unit 109 further comprises a rechargeable battery 121 and charging means 122. When the TV-set is connected to the network 111 by the power switch 116, the charging means 122 recharge the battery 121. When the TV-set is switched off, i.e. disconnected from the network 111, the battery 121 supplies sufficient energy to the components in the group 102, for accomplishing the scanning process.

Obviously, only one example of implementing the various functions has been presented. Numerous modifications are possible within the intended spirit and scope of the invention.

In an alternative embodiment, the EPG is updated at moments which are minimally inconvenient to the user, e.g. just after or before power-on/stand-by. The TV-set could be further adapted to update the EPG while the user is zapping through various TV-stations. In this case, the tuner 103 is not used for scanning the stations autonomously, but in fact the scanning behaviour of the user is utilized to collect the EPG information. The micro processor 118 might be further programmed to keep a record of TV-stations from which EPG information has been extracted recently, so that a subsequent EPG update, e.g. at night or just after power-on, can be shortened.

The remote control unit 110 also serves as input means for receiving search requests from the user, e.g. the user may enter program categories or particular movies which he is interested in. Therefore, the remote control (not shown) comprises means for entering alphanumeric characters, selecting menu options or controlling a virtual on-screen keyboard. Such means are known per se, e.g. from the European patent application EP 0 774 868 A1.

Figure 2:
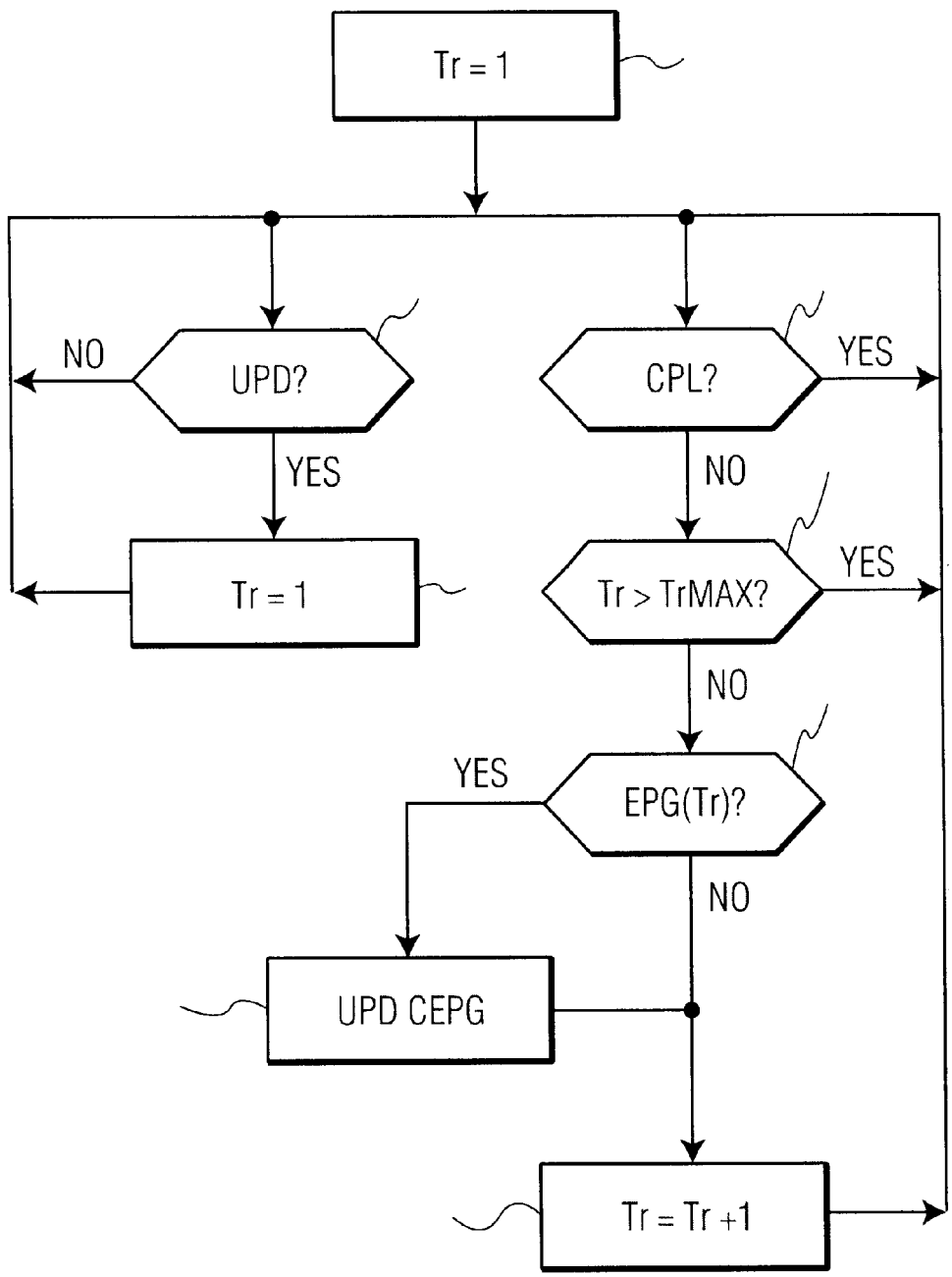
FIG. 2 shows a flow chart of the process of scanning channels for EPG information.

FIG. 2 shows a flow chart of a possible implementation of the process of scanning transport streams for EPG information, and composing and storing a compound EPG. In an initial step 200 the value '1' is assigned to a variable Tr, indicating a transport stream number. Another variable TrMax indicates the number of transport streams available. When the value of Tr is smaller than or equal to TrMax, the compound EPG has to be updated with EPG information extracted from the transport stream with number between and including Tr and TrMax. A value of Tr which is greater than TrMax indicates that the compound EPG is up-to-date. The flow chart comprises two main loops, running independently. One comprises steps 201 and 202, the other one comprises steps 203 to 207. In the step 201 a test is performed, yielding a positive result if the compound EPG needs to be updated, e.g. after every twenty four hours or after a new transport stream has become available. If this situation occurs, the step 202 is performed, assigning a value '1' to Tr, indicating that the complete compound EPG needs to be updated, by scanning all available transport streams. The other main loop starts with a step 203, checking whether the TV-set is in the coupled stated or not, in other words, whether the tuner 303 or 103 is available for the scanning process. When the tuner is available, in the decoupled state, the step 204 is performed, testing whether Tr is greater than TrMax, indicating that the compound EPG is up-to-date. If this is not the case, step 205 checks whether the transport stream with number Tr comprises EPG information. If so, it is extracted and incorporated in the compound EPG in the step 206. The loop ends with increasing the value of Tr by one. As long as the TV-receiver is in the decoupled state, the loop iterates until all available transport streams have been scanned. The iteration might be interrupted by the TV-receiver entering the coupled state, e.g. when the user activates the receiver from the stand-by mode. In that case the process is resumed as soon as the decoupled state is re-entered again, taking the last value of Tr as a starting point.

Various examples of how a compound EPG might look like are disclosed in EP 0 774 868 A1. Basically, it comprises a list of program items, which are ordered by their start time. Various ways of filtering the program items might be applied, e.g. by category or by TV station. Means for enabling a user to enter search requests are disclosed in EP 0 774 868 A1 as well, e.g. the application of a virtual on-screen keyboard for entering textual items.

Summarizing, the invention relates to a receiving apparatus comprising a receiver for receiving signals, e.g. radio or television signals, which comprises means for collecting particular information incorporated in at least a part of the signals, e.g. in order to build a compound electronic program guide. The apparatus according to the invention is adapted to perform the scanning when the receiver is not in use, e.g. during stand-by mode, or when the apparatus is performing a function which does not involve the receiver.

What is claimed is:

1. A digital television receiver for receiving a plurality of digital transport streams, comprising:

a) tuning means for selecting a selected signal from the digital transport streams in response to control signals;

b) first signal processing means for extracting and processing a first type of information, comprising video and audio information, from the selected signal, wherein during a coupled state of the receiver, an input of the first signal processing means is effectively coupled to an output of the tuning means, and during a decoupled state of the receiver, the input of the first signal processing means is effectively decoupled from the output of the tuning means;

c) second signal processing means for extracting and processing a second type of additional information from the selected signal; and d) controlling means which generate the control signals for controlling the tuning means when the receiver is in the decoupled state, said control signals being chosen such that the tuning means successively scans the digital transport streams, without user instruction, and selects a respective signal from at least a number of the digital transport streams.

2. A receiving apparatus for receiving a plurality of digital transport signals, comprising:

a) tuning means for selecting a selected signal from the digital transport signals in response to control signals;

b) first signal processing means for extracting and processing a first type of information from the selected signal, wherein during a coupled state of the receiving apparatus, an input of the first signal processing means is effectively coupled to an output of the tuning means, and during a decoupled state of the receiving apparatus, the input of the first signal processing means is effectively decoupled from the output of the tuning means;

c) and second signal processing means for extracting and processing a second type of information comprising system information (SI) from the selected signal; and d) controlling means which generate the control signals for controlling the tuning means when the receiving apparatus is in the decoupled state, said control signals being chosen such that the tuning means successively scans the digital transport streams, without user instruction, and selects a respective signal from at least a number of the digital transport signals.

3. A receiving apparatus for receiving a plurality of transmitted signals, comprising:

a) tuning means for selecting a selected signal from the transmitted signals in response to control signals;

b) first signal processing means for extracting and processing a first type of information from the selected signal, wherein during a coupled state of the receiving apparatus, an input of the first signal processing means is effectively coupled to an output of the tuning means, and during a decoupled state of the receiving apparatus, the input of the first signal processing means is effectively decoupled from the output of the tuning means;

c) second signal processing means for extracting and processing a second type of information from the selected signal, and further extracting from the second type of information electronic program guide (EPG) information such that EPGs from at least two of the transmitted signals are combined into a compound EPG; and d) controlling means which generate the control signals for controlling the tuning means when the receiving apparatus is in the decoupled state, said control signals being chosen such that the tuning means successively select a respective signal from at least a number of the transmitted signals.

4. A receiving apparatus for receiving a plurality of transmitted signals, comprising:

a) tuning means for selecting a selected signal from the transmitted signals in response to control signals;

b) first signal processing means for extracting and processing a first type of information from the selected signal, wherein during a coupled state of the receiving apparatus, an input of the first signal processing means is effectively coupled to an output of the tuning means, and during a decoupled state of the receiving apparatus, the input of the first signal processing means is effectively decoupled from the output of the tuning means;

c) and second signal processing means for extracting and processing a second type of information from the selected signal;

d) controlling means which generate the control signals in a power-off mode of the apparatus, for controlling the tuning means when the receiving apparatus is in the decoupled state, said control signals being chosen such that the tuning means successively select a respective signal from at least a number of the transmitted signals and;

e) a rechargeable battery for powering the receiving means during the scanning in the power-off mode.

* * * * *